May 6, 1941.  J. WHITE  2,240,595
ELECTRICAL SYSTEM FOR VEHICLES
Filed Feb. 7, 1938  2 Sheets-Sheet 2

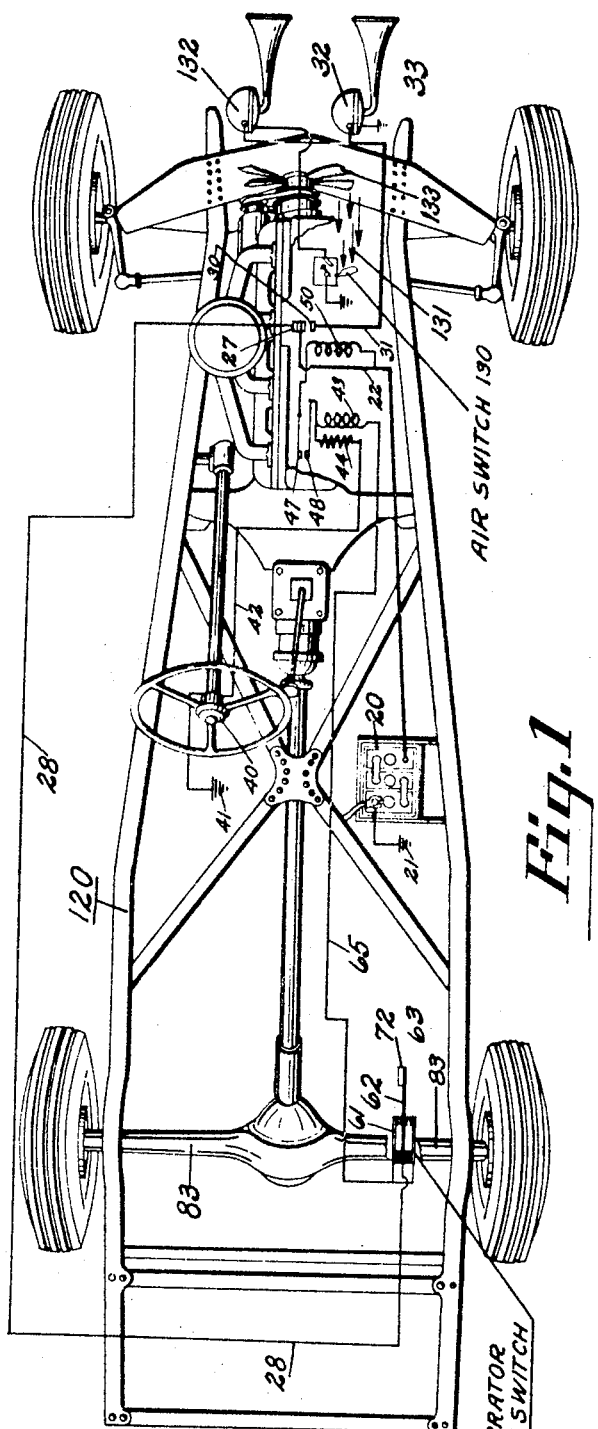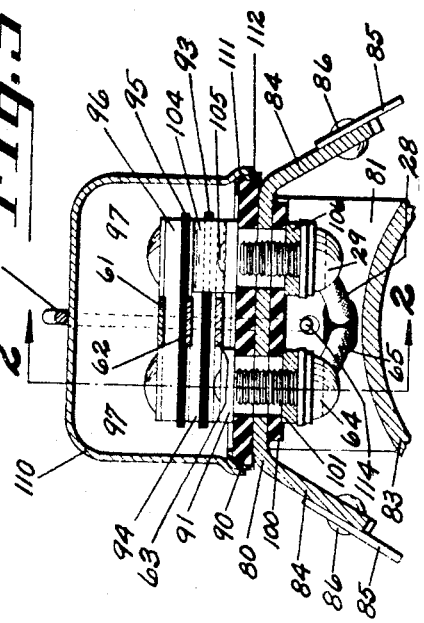

INVENTOR
Joe White
BY Spencer Hardman + Fisher
his ATTORNEYS

Patented May 6, 1941

2,240,595

UNITED STATES PATENT OFFICE 2,240,595

ELECTRICAL SYSTEM FOR VEHICLES

Joe White, Anderson, Ind., assignor to General Motors Corporation, Detroit, Mich., a corporation of Delaware Application February 7, 1938, Serial No. 189,118

4 Claims. (Cl. 177—311)

This invention relates to electrical signalling systems for automotive vehicles and more particularly to signalling systems including horns and other audible warning devices.

It is primarily the object of this invention to prevent the operation of the signalling device while the automobile is at rest. This is done to prevent the unnecessary and nuisance use of an automobile horn while the vehicle is standing at the curb. Obviously unnecessary draining of the storage battery is prevented.

In the disclosed embodiment of the present invention this object is obtained by the use of an automatic switch while it is responsive to the motion of the vehicle. This switch is open while the vehicle is at rest and closes automatically when the vehicle is in motion. When the vehicle is in motion this automatic switch conditions a relay which becomes effective to connect the source of current with the warning signal or automobile horn in case the usual push button is pressed. When the vehicle is stationary the automatic switch is open and the relay is not conditioned to connect the current source with the automobile horn, although the push button switch may be closed.

Further objects and advantages of the present invention will be apparent from the following description, reference being had to the accompanying drawings wherein a preferred embodiment of the present invention is clearly shown.

In the drawings:

Fig. 1 is a diagrammatic plan view of the chassis of an automobile showing various parts of the system including the present invention.

Fig. 2 is a sectional view of a vehicle motion responsive switch which is responsive to the vibrations of the vehicle while in motion, this section being taken on the lines 2—2 of Figs. 3 and 4.

Fig. 3 is a sectional view of the vehicle vibration responsive switch, this section being taken on the line 3—3 of Fig. 2.

Figure 5:
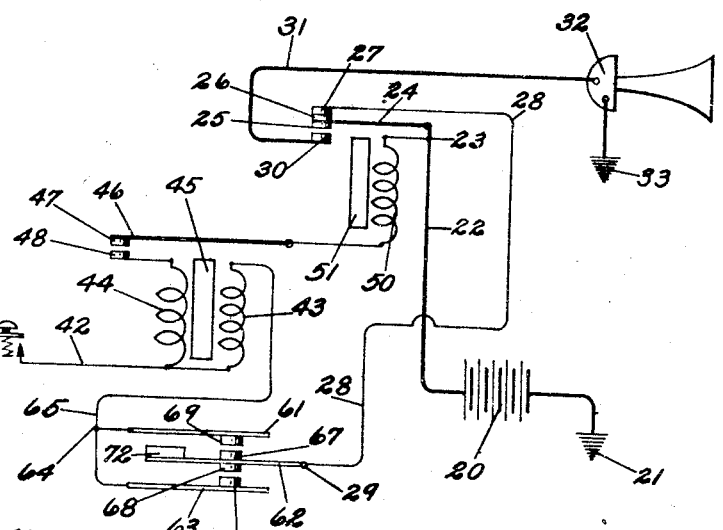
Fig. 5 is a wiring diagram showing diagrammatically the vehicle vibration responsive switch of Figs. 2, 3 and 4 applied to the control of a vehicle warning signal such as an automobile horn.

Referring first to Fig. 5, 20 designates a storage battery grounded at 21 and connected by a wire 22 with a terminal 23. Terminal 23 is connected with an armature 24 carrying a contact 25 on its lower side and contact 26 on its upper side. Contact 26 normally engages the contact 27 connected by wire 28 with a terminal 29. Contact 25 is engageable with a contact 30 connected by a wire 31 with an automobile horn 32, grounded at 33. Obviously the horn 32 will be connected with the battery 20 by the engagement of the contacts 25 and 30. Such engagement, however, will not occur unless the push-button of a controller switch is closed and the vehicle is in motion.

The manually operated push button or controller switch is indicated at 40 and has one of its terminals grounded at 41 and the other connected by wire 42 with a magnet coil 43 of relatively large number of turns of fine wire and a magnet coil 44 of relatively few turns of coarse wire. Both magnet coils are wound upon the same core 45 and effect the attraction of an armature 46 carrying contact 47 into engagement with the contact 48 connected with the winding 44 thereby providing a by-pass relay.

Armature 46 is connected with magnet coil 50 surrounding core 51 which attracts the armature 24 when the winding 50 is energized. These elements act as a horn connecting relay.

The automatic or vehicle vibration responsive switch comprises three leaf-spring members 61, 62 and 63. The members 61 and 63 are fixed at one end and are connected with a terminal 64 which is connected by wire 65 with the magnet coil 43. Leaf-spring member 62 is fixed at one end and is connected with the terminal 29. Member 62 carries contacts 67 and 68 engageable respectively with contacts 69 and 70 carried respectively by the leaf-spring members 61 and 63. Member 62 carries a weight 72 at its free end. Member 62 is located on the vehicle so that it occupies generally a horizontal plane; therefore its free end carrying the weight 72 moves substantially vertically. Member 62 is sufficiently stiff normally to maintain contacts 67 and 68 out of engagement with contacts 69 and 70 while the vehicle is at rest.

While the vehicle is at rest the battery 20 cannot be connected with the horn 32 by closing the switch 40 because contacts 47 and 48 which would connect magnet coil 44 with the battery 20 are normally open, and contacts 69, 67 and 68, 70 which would connect coil 43 with the battery 20 are normally open.

The leaf-spring member or reed 62 of the vehicle vibration responsive switch is sufficiently sensitive to respond to even light vibrations of the vehicle; therefore, when the vehicle is in motion, the weight 72 will be vibrating vertically, thereby causing contact 68 to engage contact 70 or contact 67 to engage contact 69. Whenever this occurs and switch 40 is closed, current will flow from the battery to the magnet winding 43 through the following circuit: battery 20, wire 22, terminal 23, armature 24, contact 26, contact 27, wire 28, terminal 29, reed 62, contacts 67, 69 or 68, 70, leaf spring 61 or 63, terminal 64, wire 65, magnet winding 43, wire 42, switch 40 and ground connections 41 and 21. The vibration responsive switch therefore automatically conditions the signal circuit for completion by the control switch.

Magnet coil 43 being energized, armature 46 will be attracted toward core 45, thereby effecting the closing of contacts 47 and 48. When this occurs magnet coil 44 will be connected with the contact 26 through the following circuit: battery 20, wire 22, terminal 23, magnet coil 50, armature 46, contact 47, contact 48, winding 44, wire 42, switch 40 and ground connections 41 and 21. Thereafter, so long as the switch 40 is closed, contacts 47 and 48 will remain closed regardless of the fact that contacts 67 and 68 of the vehicle motion responsive switch are vibrating between, and are alternately engaging switch contacts 69 and 70 thereof. It is apparent that coil 43 is an energizing coil which attracts the armature 46 into contact-making position, and that coil 44 is a holding coil which holds these contacts in engagement regardless of the status of the coil 43. Thus in using the relay with the coils 43 and 44, the horn circuit is first closed and then held closed continuously during the period that the switch 40 is held closed manually. That avoids the objection that would follow if dependence were placed on the contacts 67, 69 or 68—70 of the vibration responsive switch, which close but intermittently, and not dependable alone for the horn blowing function.

As stated before, when contacts 47 and 48 are closed, current flows from the battery through the winding 50. This effects the attraction of the armature 24 toward the core 51, thereby effecting the closing of contacts 25 and 30 which cause the horn 32 to be directly connected with the battery 20. While contacts 25 and 30 are closed, contacts 26 and 27 are separated and the circuit of the automatic vehicle vibration switch is opened resulting in complete deenergization of relay winding 43. When once the circuit has been conditioned for establishment of connections between the battery 20 and horn 32 by the closing of switch 40, the circuit remains conditioned as long as switch 40 remains closed regardless of the status of the automatic switch. Obviously when the operator releases the button switch 40, all of the relay windings 50, 44 and 43 will be de-energized since their circuits depend upon the closing of the switch 40 for connection with the battery. Thus it is apparent that the horn cannot be sounded except while the vehicle is in motion; and the nuisance use of the horn and unnecessary draining of the storage battery is prevented. By incorporating a control system of that character the unnecessary and nuisance effect caused by loud and long blowing of automobile horns while the vehicle is standing at the curb, such as occurs in Hallowe'en pranks, or with callers who drive up to the curb and thoughtlessly or for want of courtesy start blowing their horn for the house occupants to come out, is eliminated. This system of control automatically limits the use of the automobile horn to that for which it was originally designed, namely a signalling or warning device for a moving vehicle.

Figure 4:
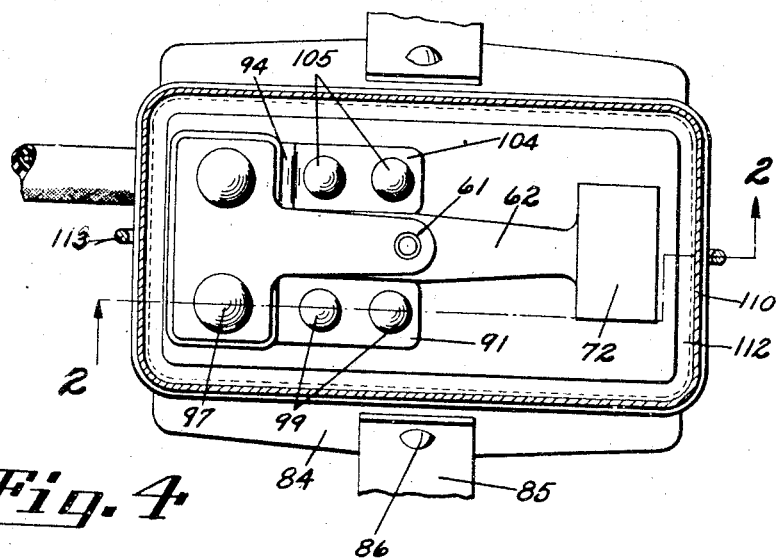
Fig. 4 is a plan view of the vehicle vibration responsive switch shown in Figs. 2 and 3, the cover being shown in section.

Referring now to Figs. 2, 3 and 4, the details of the automatic circuit conditioning switch in the form of the vehicle vibration responsive switch will be described. This switch includes a base or frame 80 which is located generally in a horizontal plane. At each end thereof the base is provided with downwardly extending legs 81, each having a notch 82 of cylindrical contour and of such dimensions as to conform to the exterior surface of the rear axle housing 83 of the vehicle (see Fig. 1). The base 80 is provided with obliquely downwardly extending ears 84 to which the ends of a strap 85 are connected by rivets 86. The strap 85 passes around the housing 83 in the well known manner (not shown) in order to clamp the legs 81 of the bracket or frame 80 firmly against the exterior surface of the axle housing 83.

The base 80 supports a nonconducting plate 90 upon its upper surface. Plate 90 carries a stack of metallic and nonconducting parts comprising a metal plate 91, the leaf-spring member 63, a metal spacer 92, a nonconducting spacer 93, a metal spacer 94, leaf-spring member 62, nonconducting spacer 95, metal spacer 96 and leaf-spring member 61. Rivets 97 are insulated from the contacts 62 by nonconducting sleeve or bushing 98 which passes through the stack members 92, 93, 94, 62, 95 and 96. The plate 91 and the plate 90 are secured to the base 80 by rivets 99 which also fix, to the underside of the base 80, a non-conducting plate 100 and a metal plate 101 to which the terminal screw 64 is attached and which connects the wire 65. Rivets 99 and the screw 64 do not touch the base 80. The plate 101, rivets 99, plate 91 and rivets 97 provide an electrical path between the terminal 64 and the contact members 61 and 63.

Referring to Figs. 2 and 3, it will be seen that the central leaf spring member or reed 62 is in contact with the plate 94. This plate 94 carries a strap or extension 104 secured by rivets 105 to the base 80 (see Fig. 4), said rivets 105 passing through the plate 90, the base 80, the plate 100 and a metal plate 106 (see Fig. 3) into which the terminal screw 29 is threaded.

The switch parts are enclosed by a cover 110, having its flange 111 shaped to fit around the nonconducting plate 90 with a rubber sealing gasket 112 between them. The cover 110 is held in position by bale 113, the ends 114 of which are received by holes 115 in the legs 81 of the base 80.

The vehicle vibration responsive switch is shown diagrammatically in Fig. 1 as being mounted upon the rear axle housing 83 of the automobile, the chassis of which is indicated generally by numeral 120. Obviously the representation of this engine is purely diagrammatic. It will be understood that, as actually installed, the reed 62 will be located in a horizontal plane so that the weight 72 vibrates vertically. The other parts of the system are indicated by the same reference numerals as applied to Figs. 4 and 5. Fig. 1, however, shows an additional horn 132 which is known as the country-driving horn. The connection of horn 132 with the battery 20 is dependent of course upon the closing of the switch 40 and relays shown in Fig. 5 and also upon the closing of an air switch 130, the vane or paddle of which is located in a current of air represented by arrows 131 induced by the rotation of the engine cooling fan 133. When the speed of rotation of this fan exceeds a certain amount, the air switch 130 will be closed so that the country-driving horn 132 will be sounded along with the city-driving horn 32 when the switch 40 is closed.

Figure 6:
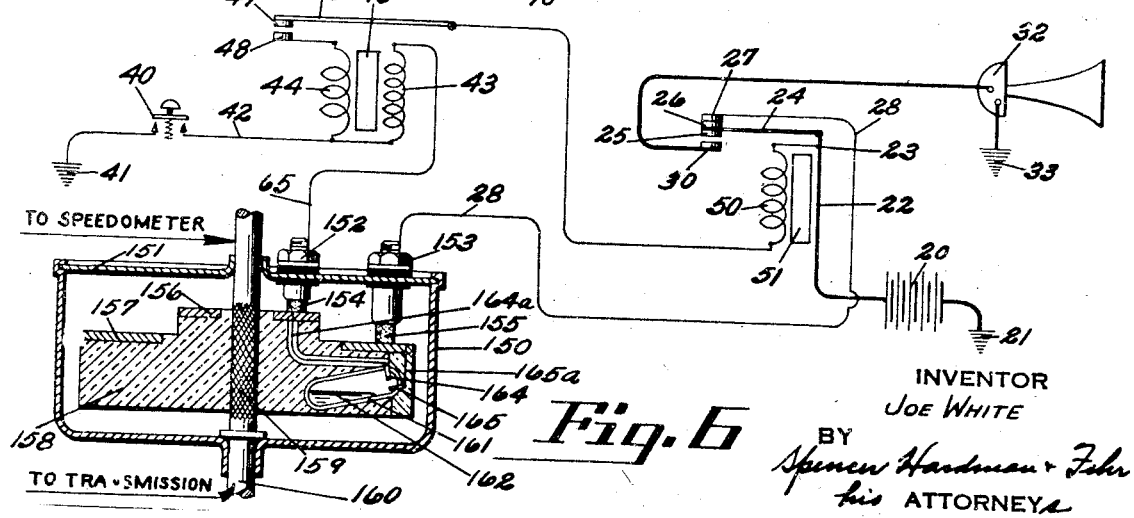
Fig. 6 is a wiring diagram similar to that shown in Fig. 5, the vehicle vibration responsive switch being replaced by a centrifugal switch which operates to close a circuit while the vehicle is in motion.

The wiring diagram shown in Fig. 6 is the same as that shown in Fig. 5, with the exception that a vehicle motion responsive, centrifugal switch as a circuit conditioning means replaces the vehicle motion responsive, vibratory switch. This centrifugal switch comprises a stationary cup-shaped housing 150, closed by cover 151, which insulatingly supports terminals 152 and 153 to which wires 65 and 28 are respectively connected. Terminals 152 and 153 carry brushes 154 and 155 respectively, engageable respectively with commutating rings 156 and 157 carried by a non-conducting block 158. Block 158 is bonded to the knurled portion 159 of a shaft 160 which may form a part of the shaft connections between the automobile transmission and speedometer. Block 158 carries a mercury switch which includes a small glass vessel 161 containing mercury 162. This vessel 161 is inclined so that the mercury 162 is normally in its lower end and not in contact with switch points 164 and 165. Point 164 is connected by wire 164a with commutating ring 156. Point 165 is connected by wire 165a with commutating ring 157. When the speed of rotation of the shaft 160 exceeds a certain amount, which is relatively small, the mercury 162 will move outwardly from its location shown in Fig. 6 and occupy the upper end of the vessel 161, thereby causing contact points 164 and 165 to be connected. This effects the same condition of the control circuits as effected by the closing of contacts 67, 69 and 68, 80 described with reference to Fig. 5. That is, when the vehicle attains even a relatively low speed the circuit is conditioned so that the vehicle horn 32 can be operated by closing the push-button switch 40.

While the embodiment of the present invention as herein disclosed, constitutes a preferred form, it is to be understood that other forms might be adopted, all coming within the scope of the claims which follow.

What is claimed is as follows:

1. A system of horn control for a moving vehicle while in service, comprising in combination a horn for sounding a signal audible to persons in the proximate path of a moving vehicle, a battery, means for connecting the horn with the battery and including a manual switch with normally open contacts for sounding the audible signal at will during vehicle movement, and a relay having an operating coil and a holding coil, means serially connecting the operation coil, the manual switch, battery, and an automobile switch having normally open contacts, and means to momentarily close the contacts in response to vibration due to continued movement of the vehicle, said relay having normally open contacts adapted to be closed upon momentary energization of the operating coil, a circuit serially connecting said contacts, said horn, said battery, said holding coil and said manual switch so that said contacts are maintained closed by the holding coil for connecting the horn with the battery, whereby the momentary engagement of the contacts of the automatic switch responsive to movement of the vehicle and the closing of manual switch effect closing of the relay contacts in another circuit to cause the sounding of the horn.

2. A system of horn control for a moving vehicle, comprising in combination, a horn for sounding an audible signal of a motor vehicle, a battery, means for connecting the horn with the battery including a manual switch for controlling the audible signal at will, and a by-pass relay having an operating coil and a holding coil in parallel, said by-pass relay having a pair of normally open engageable contacts serially connected with the holding coil and the battery and having its operating coil connected in a control circuit parallel with the holding coil, means preparing the by-pass relay for actuation by the manual switch, comprising an oscillatory momentum device including a pair of relatively fixed contacts connected together and serially with the operating coil of the by-pass relay, and a relatively movable contact normally out of engagement but adapted to engage one or another of the fixed contacts, and normally having a direct connection with the battery, and means sensitive to vibration due to continued movement of the vehicle in motion, and operable to momentarily engage the movable contact with one of the fixed contacts, whereby operation of the manual switch while the contacts of the momentum device are closed will connect the operating coil of the by-pass relay to the battery through the oscillatory momentum device, the holding coil of the by-pass relay then being connected with the battery and resulting in the horn being directly connected to the battery so long as the manual switch remains closed.

3. In a traffic warning signal, a system of horn control for sounding an audible signal to persons in the proximate path of vehicle movement, comprising in combination, an automobile horn, a battery for energizing the horn, a manually operated switch with normally open contacts for controlling the signal at will, and means including a normally open switch with means to momentarily close the same in response to vibration due to continued movement of the vehicle for completing a circuit between the manual switch and battery when the manual switch is closed, whereby an audible signal may be sounded while the vehicle is moving over the roadway, but may not be sounded while the vehicle is standing still.

4. In a traffic warning signal, a system of horn control for sounding an audible signal to persons in the proximate path of vehicle movement, comprising in combination, an automobile horn, a battery for energizing the horn, a manually operated switch with normally open contacts for controlling the signal at will, a relay having an operating coil serially connected with the manual switch, and having a holding coil and normally open contacts shunted about the operating coil, and means including a normally open switch with means to momentarily close the same in response to vibration due to continued movement of the vehicle for completing a circuit between the manual switch and battery when the manual switch is closed, said circuit including the operating coil of the relay, which, when energized effects closing of the relay contacts and energization of the holding coil for sounding of the audible signal only when the vehicle is moving.

JOE WHITE.